US010209766B2

(12) United States Patent
Han et al.

(10) Patent No.: US 10,209,766 B2
(45) Date of Patent: Feb. 19, 2019

(54) DISPLAYING METHOD IN LOW POWER MODE AND ELECTRONIC DEVICE SUPPORTING THE SAME

(71) Applicant: Samsung Electronics Co., Ltd., Suwon-si, Gyeonggi-do (KR)

(72) Inventors: Minsu Han, Suwon-si (KR); Inpyo Kang, Suwon-si (KR); Eunbi Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 14/833,319

(22) Filed: Aug. 24, 2015

(65) Prior Publication Data
US 2016/0062450 A1 Mar. 3, 2016

(30) Foreign Application Priority Data
Aug. 29, 2014 (KR) .................... 10-2014-0114605

(51) Int. Cl.
| | | |
|---|---|---|
| G06F 3/048 | (2013.01) | |
| G06F 3/0481 | (2013.01) | |
| G06T 1/00 | (2006.01) | |
| G09G 5/00 | (2006.01) | |
| G09G 5/36 | (2006.01) | |

(52) U.S. Cl.
CPC .......... *G06F 1/3296* (2013.01); *G06F 1/3265* (2013.01); *G06F 3/048* (2013.01); *G06F 3/0481* (2013.01); *G06T 1/00* (2013.01); *G09G 5/003* (2013.01); *G09G 5/363* (2013.01); *G09G 2330/021* (2013.01)

(58) Field of Classification Search
CPC ...... G06F 1/3265; G06F 3/048; G06F 3/0481; G06T 1/00; G09G 5/003; G09G 5/363
USPC .......................................... 715/778
See application file for complete search history.

(56) References Cited

U.S. PATENT DOCUMENTS

| | | | |
|---|---|---|---|
| 9,430,988 B1 * | 8/2016 | Hancock | G09G 5/10 |
| 9,436,269 B2 * | 9/2016 | Yang | G06F 1/3287 |
| 9,619,100 B2 * | 4/2017 | Nurmi | G06F 3/0481 |
| 9,753,527 B2 * | 9/2017 | Connell | G06F 1/3265 |
| 9,804,665 B2 * | 10/2017 | DeBates | G06F 1/3209 |
| 2011/0092227 A1 * | 4/2011 | Phukan | G06F 17/3087 455/456.3 |
| 2011/0216102 A1 | 9/2011 | Kim | |
| 2012/0047380 A1 * | 2/2012 | Nurmi | G06F 1/3203 713/320 |
| 2013/0159408 A1 * | 6/2013 | Winn | G06N 99/005 709/204 |

(Continued)

FOREIGN PATENT DOCUMENTS

KR 10-2011-0099411 A 9/2011

*Primary Examiner* — David Phantana-angkool
(74) *Attorney, Agent, or Firm* — Jefferson IP Law, LLP

(57) ABSTRACT

A method of displaying a user interface on an electronic device is provided. The method includes displaying the user interface in a normal mode, determining whether or not the normal mode is converted into a low power mode, and if the normal mode is converted into the low power mode, displaying a first simplified user interface, which has at least some information identical to that of the user interface, and is configured by removing at least some information from an image displayed in the normal mode.

20 Claims, 13 Drawing Sheets

(56) References Cited

U.S. PATENT DOCUMENTS

| | | | | |
|---|---|---|---|---|
| 2014/0333602 A1* | 11/2014 | Yang | .................... | G06F 1/3262 |
| | | | | 345/212 |
| 2014/0344608 A1* | 11/2014 | Wang | ................... | G06F 1/3287 |
| | | | | 713/324 |
| 2014/0359334 A1* | 12/2014 | Kutch | .................. | G06F 1/3287 |
| | | | | 713/324 |
| 2015/0061988 A1* | 3/2015 | Galu, Jr. | ............... | G06F 1/3265 |
| | | | | 345/102 |
| 2015/0185811 A1* | 7/2015 | Connell | .................. | G06T 1/60 |
| | | | | 345/173 |
| 2016/0299673 A1* | 10/2016 | Son | ...................... | G06F 1/3203 |
| 2016/0349861 A1* | 12/2016 | Lu | ........................ | G06F 3/0362 |
| 2016/0349868 A1* | 12/2016 | Kim | ...................... | G06F 3/041 |

\* cited by examiner

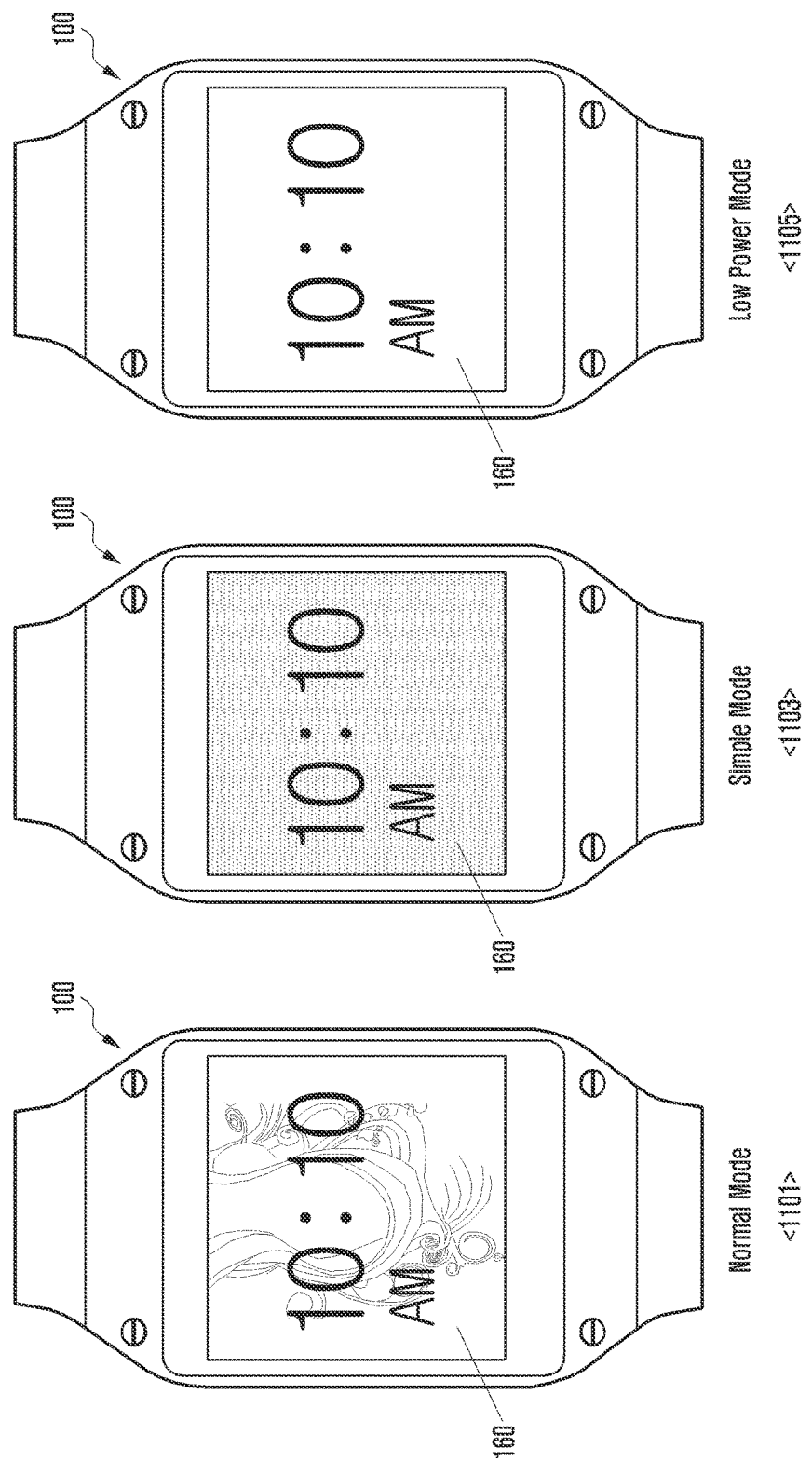

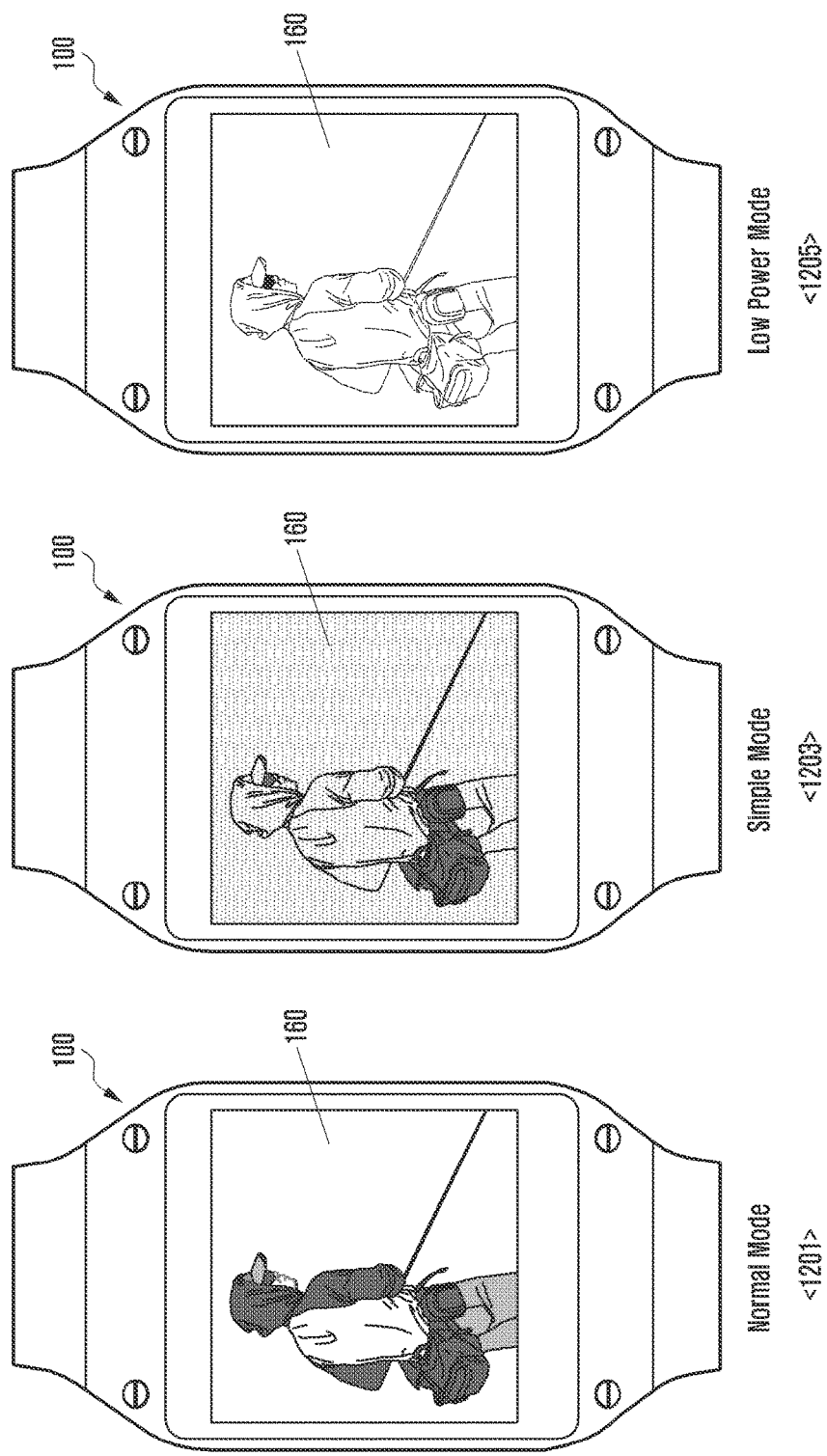

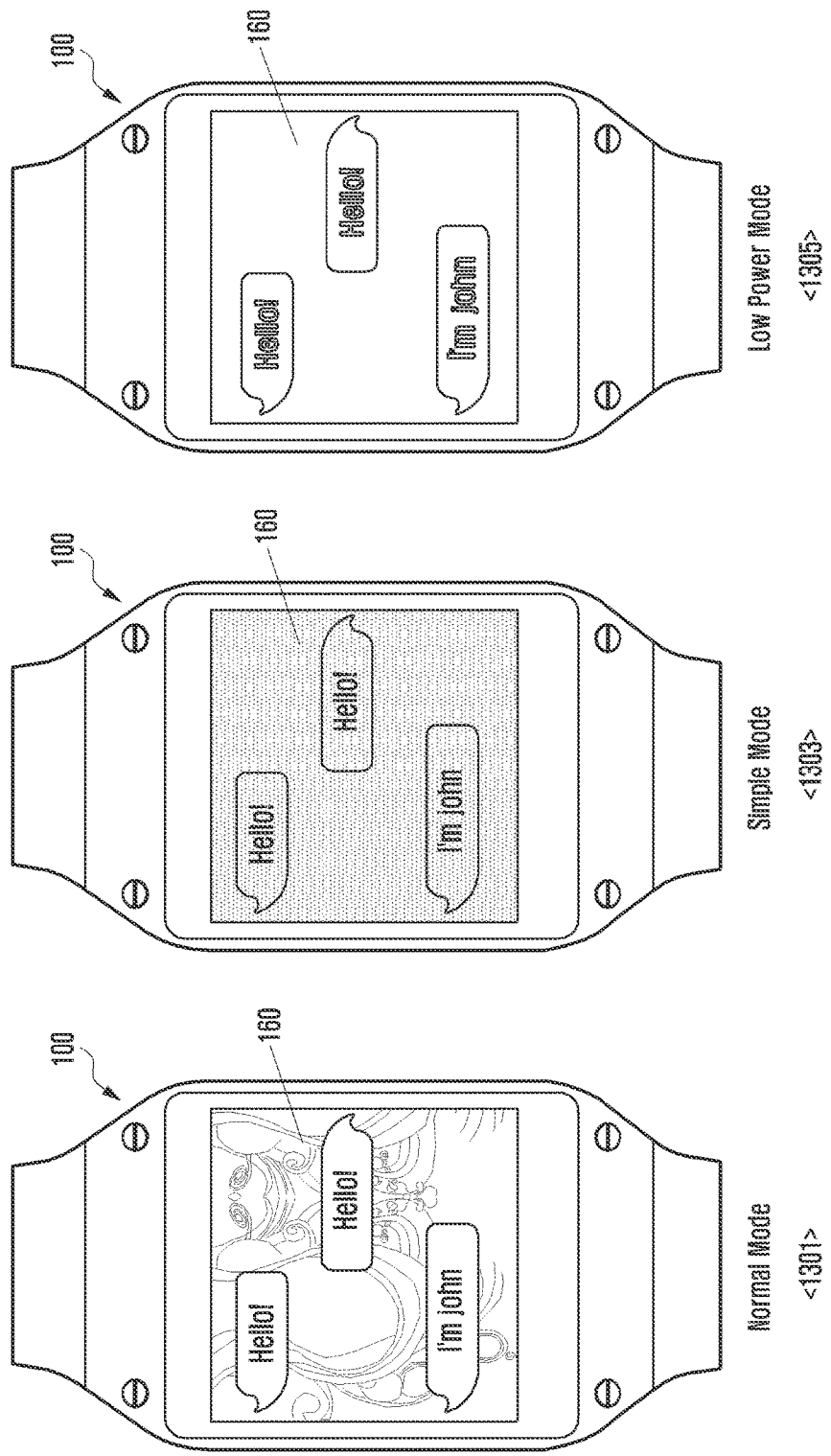

DISPLAYING METHOD IN LOW POWER MODE AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Aug. 29, 2014 in the Korean Intellectual Property Office and assigned Serial number 10-2014-0114605, the entire disclosure of which is hereby incorporated by reference.

TECHNICAL FIELD

The present disclosure relates to a method for displaying information on a display when an electronic device adopting the display is in a low power mode or is converted into the low power mode, and an electronic device for supporting the same.

BACKGROUND

Wearable computers or wearable devices may refer to electronic devices, such as glasses, watches, or clothing, which can be worn on a body of a user. The electronic devices, such as the wearable devices, have developed into connected devices with the spread of smart phones, and have the ability to perform a function of notifying the user of messages, emails, received calls, or social network services while interworking with the smart phones or mobile phones, and moreover, the wearable devices have the trend of performing the functions above by themselves.

The electronic devices, such as the wearable devices, may be worn on the user's body like accessories to communicate with the user at the nearest position to the user. The wearable device may continue to collect detailed information on surroundings or changes in the body in real time. To this end, studies about low power technology by which the wearable devices can be used for a long time, and studies about minimization, stretchability, and flexibility of a material to enhance the wearability of the wearable devices are in progress.

These electronic devices, such as the wearable devices, need to continuously provide information to the user while continuing to operate for a long period of time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for continuously displaying information when an electronic device is in a low power mode or is converted into the low power mode, and an electronic device for supporting the same.

In accordance with an aspect of the present disclosure, a method of displaying a user interface on an electronic device is provided. The method includes displaying a user interface in a normal mode, determining whether or not the normal mode is converted into a low power mode, and if the mode is converted into the low power mode, displaying a first simplified user interface, which has at least some information identical to that of the user interface, and is configured by removing at least some information from an image displayed in the normal mode.

In accordance with another aspect of the present disclosure, an electronic device for displaying a user interface is provided. The electronic device includes a display and a processor configured to display the user interface on the display in a normal mode, determine whether or not the normal mode is converted into a low power mode, and if the normal mode is converted into the low power mode, display, on the display, a first simplified user interface, which has at least some information identical to that of the user interface, and is configured by removing at least some information from an image displayed in the normal mode.

The method and the electronic device supporting the same, according to various embodiments of the present disclosure, can provide information to the user for a long time using minimum power.

In addition, the method and the electronic device supporting the same, according to various embodiments of the present disclosure, can convert the power mode while maintaining the original look and feel of the images or the user interface, which is displayed on a display, so that the user may feel natural in the conversion of the images or the user interface.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 illustrates an example of images of a user interface of an electronic device in a normal mode, a simple mode and a low power mode according to an embodiment of the present disclosure;

FIG. 12 illustrates an example of images of a user interface of an electronic device in a normal mode, a simplified mode and a low power mode according to an embodiment of the present disclosure; and FIG. 13 illustrates an example of images of a user interface of an electronic device in a normal mode, a simplified mode and a low power mode according to an embodiment of the present disclosure.

Throughout the drawings, like reference numerals will be understood to refer to like parts, components, and structures.

DETAILED DESCRIPTION

Figure 1:
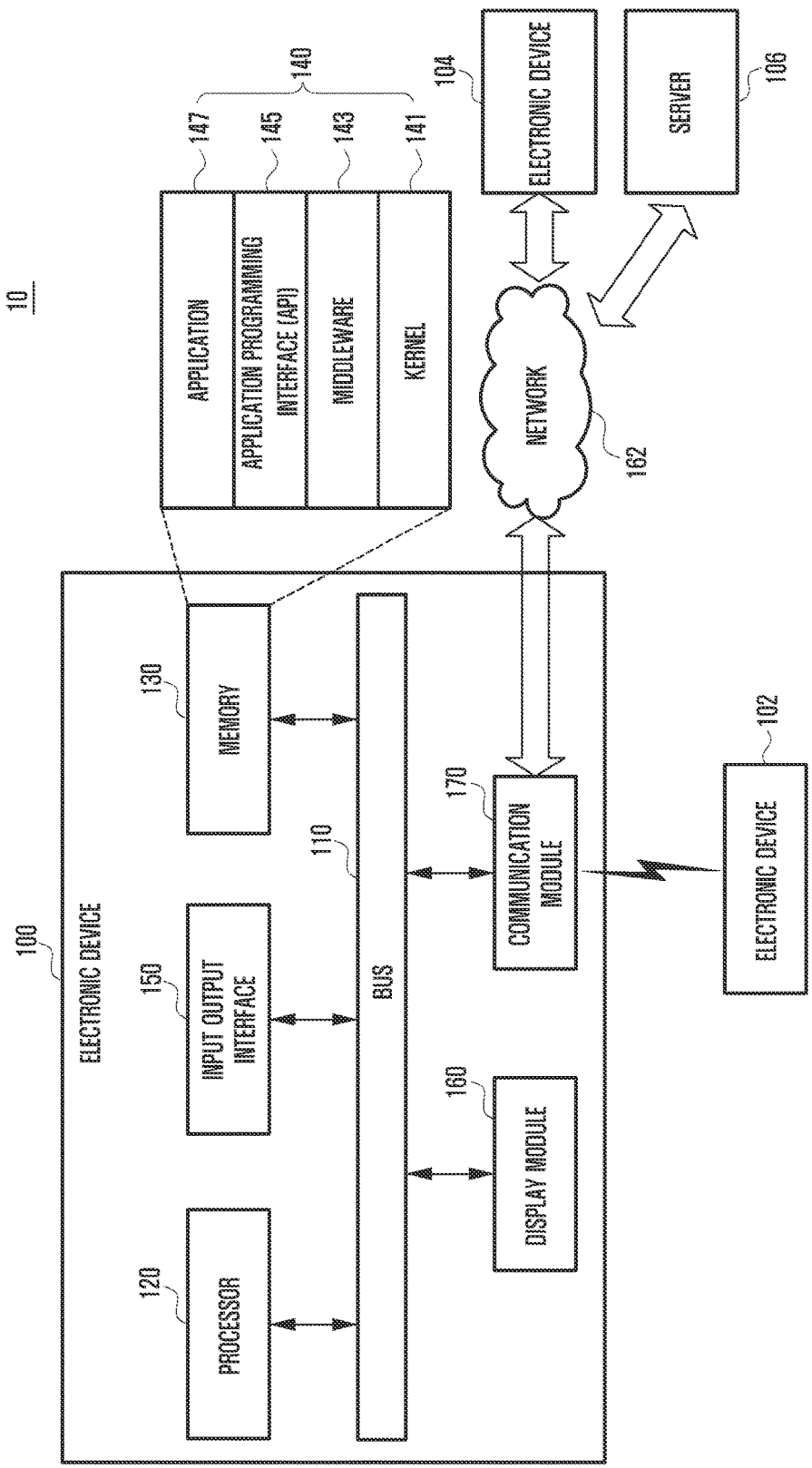
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expressions "1," "2," "first," or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, and a wearable device (for example, a head-mounted-device (HMD) such as electronic glasses, electronic clothes, an electronic bracelet, an electronic necklace, an electronic appcessory, an electronic tattoo, and a smart watch).

According to various embodiments of the present disclosure, the electronic device may be a smart home appliance having a communication function. The smart home appliance may include at least one of a television (TV), a digital versatile Disc (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to various embodiments of the present disclosure, the electronic device may include at least one of various types of medical devices (for example, a magnetic resonance angiography (MRA) device, a magnetic resonance imaging (MRI) device, a computed tomography (CT) device, a scanner, an ultrasonic device and the like), a navigation device, a global positioning system (GPS) receiver, an event data recorder (EDR), a flight data recorder (FDR), a vehicle infotainment device, electronic equipment for a ship (for example, a navigation device for ship, a gyro compass and the like), avionics, a security device, a head unit for a vehicle, an industrial or home robot, an automatic teller machine (ATM) of financial institutions, and a point of sale (POS) device of shops.

According to various embodiments of the present disclosure, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

According to an embodiment of the present disclosure, a screen of an electronic device may be split into at least two windows according to a predefined split manner and displayed through a display of an electronic device. The windows are defined as split windows. According to an embodiment of the present disclosure, the split windows are defined as windows displayed on a display of an electronic display not to be superposed one on another.

According to an embodiment of the present disclosure, a popup window is defined as a window displayed on a display of an electronic device to hide or to be superposed on a portion of a screen under execution.

According to an embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIGS. 1 through 13, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a network environment including an electronic device according to an embodiment of the present disclosure.

Referring to FIG. 1, an electronic environment 10 includes an electronic device 100, wherein the electronic device 100 includes a bus 110, a processor 120, a memory 130, an input output interface 150, a display module 160 and a communication module 170.

The bus 110 may be a circuit connecting the above described components and transmitting communication (for example, a control message) between the above described components. The processor 120 receives commands from other components (for example, the memory 130, the input output interface 150, the display module 160, the communication module 170) through the bus 110, analyzes the received commands, and executes calculation or data processing according to the analyzed commands.

The memory 130 stores commands or data received from the processor 120 or other components (for example, the input output interface 150, the display module 160, or the communication module 170) or generated by the processor 120 or other components. The memory 130 may include programming modules 140, for example, a kernel 141, middleware 143, an application programming interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control.

The input output interface 150 can receive, for example, a command and/or data from a user, and transfer the received command and/or data to the processor 120 and/or the memory 130 through the bus 110. The display module 160 can display an image, a video, and/or data to a user.

According to an embodiment of the present disclosure, the display module 160 may display a graphical user interface (GUI) image for interaction between the user and the electronic device 100. According to various embodiments of the present disclosure, the GUI image may include interface information to activate a function for correcting color of the image to be projected onto the screen. The interface information may be in the form of, for example, a button, a menu, or an icon.

The communication module 170 connects communication between the electronic device 100 and an external device (for example, an electronic device 102, an electronic device 104 or a server 106). For example, the communication interface 160 may access a network 162 through wireless or wired communication to communicate with the external device. The wireless communication includes at least one of, for example, wireless fidelity (Wi-Fi), bluetooth (BT), near field communication (NFC), a GPS, and cellular communication (for example, long term evolution (LTE), LTE-advanced (LTE-A), code division multiple access (CDMA), wideband CDMA (WCDMA), universal mobile telecommunications system (UMTS), wireless broadband (WiBro) or global system for mobile communications (GSM)). The wired communication may include at least one of, for example, a universal serial bus (USB), a high definition multimedia interface (HDMI), recommended standard 232 (RS-232), and a plain old telephone service (POTS).

Referring to FIG. 1, the electronic device 100 may operate in a normal module or in a low power mode according to the using environment.

In the normal mode, the electronic device 100 may be operated according to one or more processes. In an embodiment of the present disclosure, in the normal mode, the electronic device 100 may use a plurality of processes in order to display a UI. However, in the low power mode, the electronic device 100 may create a UI using a low power process.

The low power process is a unit or a program unit for controlling the electronic device 100 when the electronic device 100 is operated in the low power mode.

In the normal mode, the electronic device 100 may control elements 110 to 170 of the electronic device 100 using one or more processes. For example, in the normal mode, the electronic device 100 may control the elements thereof using one or more processes, and at this time, the low power process may be in the idle mode or in an off-state.

The electronic device 100 may control elements using the low power process in the low power mode. For example, in the low power mode, the electronic device 100 may control the elements thereof using the low power process, and at this time, the process operated in the normal mode may be in the idle mode or in the off-state.

In the low power mode, the electronic device 100 may control functions thereof at a minimum power. The electronic device 100, according to an embodiment of the present disclosure, may have the display 160 that is implemented as a liquid crystal display (LCD), an organic light-emitting diode (OLED), an active matrix OLED (AMO-LED), or the like.

In the low power mode, the electronic device 100 may control the display 160 and may display information through the display 160 using the low power process. In the low power mode, the display 160 may be operated at a minimum brightness or at a brightness configured by the user. The electronic device 100 may control the brightness of the display 160 by controlling the power supplied to a back light of the display 160. In addition, in the low power mode, the electronic device 100 may control the quality of the display 160 to be lower than the display quality in the normal mode, using only a part of pixels and color/gray levels of the display 160.

The low power mode, according to an embodiment of the present disclosure, may be an AMOLED low power mode (ALPM).

Figure 2:
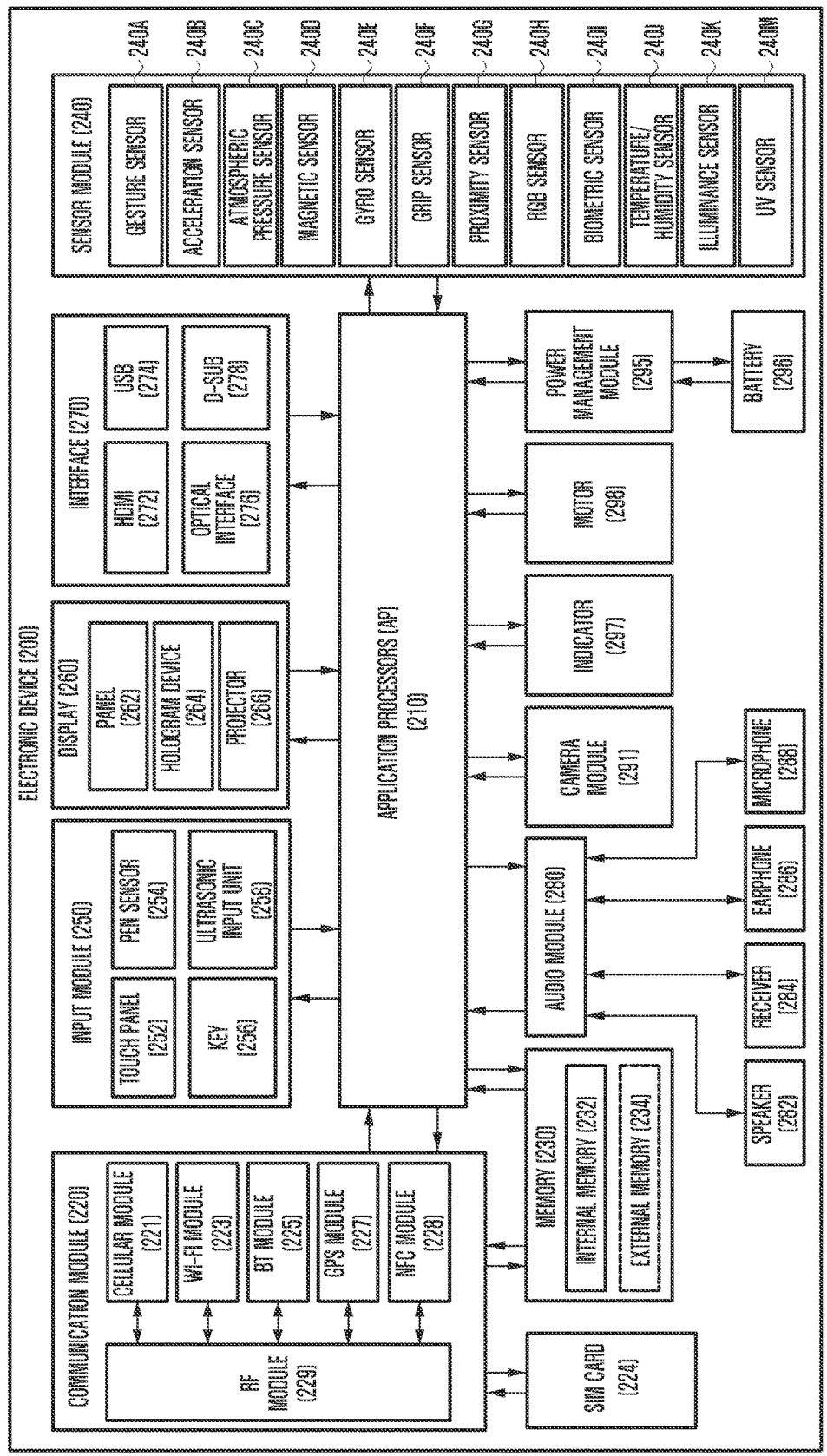
FIG. 2 is a block diagram of an electronic device according to an embodiment of the present disclosure.

FIG. 2 is a block diagram of an electronic device according to an embodiment of the present disclosure. The electronic device may configure, for example, a whole or a part of the electronic device 100 illustrated in FIG. 1.

Referring to FIG. 2, an electronic device 200 is illustrated, where the electronic device 200 includes one or more application processors (APs) 210, a communication module 220, an subscriber identification module (SIM) card 224, a memory 230, a sensor module 240, an input module 250, a display 260, an interface 270, an audio module 280, a camera module 291, a power management module 295, a battery 296, an indicator 297, and a motor 298. The AP 210 operates an operating system (OS) or an application program so as to control a plurality of hardware or software component elements connected to the AP 210 and execute various data processing and calculations including multimedia data. The AP 210 may be implemented by, for example, a system on chip (SoC). According to an embodiment of the present disclosure, the processor 210 may further include a graphics processing unit (GPU).

The communication module 220 (for example, the communication module 170 of FIG. 1) transmits/receives data in communication between different electronic devices (for example, the electronic device 104 and the server 106 of FIG. 1) connected to the electronic device 200 (for example, electronic device 100 of FIG. 1) through a network. According to an embodiment of the present disclosure, the communication module 220 includes a cellular module 221, a Wi-Fi module 223, a BT module 225, a GPS module 227, an NFC module 228, and a radio frequency (RF) module 229.

The cellular module 221 provides a voice, a call, a video call, a short message service (SMS), or an Internet service through a communication network (for example, LTE, LTE-A, CDMA, WCDMA, UMTS, WiBro, GSM or the like). Further, the cellular module 221 may distinguish and authenticate electronic devices within a communication network by using a SIM (for example, the SIM card 224). According to an embodiment of the present disclosure, the cellular module 221 performs at least some of the functions which can be provided by the AP 210. For example, cellular module 221 may perform at least some of the multimedia control functions.

According to an embodiment of the present disclosure, the cellular module 221 may include a communication processor (CP). Further, the cellular module 221 may be implemented by, for example, an SoC.

According to an embodiment of the present disclosure, the AP 210 or the cellular module 221 (for example, CP) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are illustrated as blocks separate from each other, at least some (for example, two or more) of the cellular module 221, the Wi-Fi module 223, the BT module 225, the GPS module 227, and the NFC module 228 may be included in one integrated chip (IC) or one IC package according to an embodiment of the present disclosure. For example, at least some (for example, the communication processor corresponding to the cellular module 221 and the Wi-Fi processor corresponding to the Wi-Fi module 223) of the processors corresponding to the cellular module 221, the Wi-Fi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a power amp module (PAM), a frequency filter, a low noise amplifier (LNA) or the like. Further, the RF module 229 may further include a component for transmitting/receiving electronic waves over a free air space in wireless communication, for example, a conductor, a conducting wire, or the like.

Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to an embodiment of the present disclosure.

The SIM card 224 is a card including a SIM and may be inserted into a slot formed in a particular portion of the electronic device. The SIM card 224 includes unique identification information (for example, integrated circuit card identifier (ICCID)) or subscriber information (for example, international mobile subscriber identity (IMSI).

The memory 230 (for example, the memory 130 of FIG. 1) may include an internal memory 232 or an external memory 234. The internal memory 232 may include, for example, at least one of a volatile memory (for example, a random access memory (RAM), a dynamic RAM (DRAM), a static RAM (SRAM), a synchronous DRAM (SDRAM), and the like), and a non-volatile memory (for example, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment of the present disclosure, the internal memory 232 may be a solid state drive (SSD). The external memory 234 may further include a flash drive, for example, a compact flash (CF), a secure digital (SD), a micro-SD, a mini-SD, an extreme Digital (xD), or a memory stick. The external memory 234 may be functionally connected to the electronic device 200 through various interfaces. According to an embodiment of the present disclosure, the electronic device 200 may further include a storage device (or storage medium) such as a hard drive.

The sensor module 240 measures a physical quantity or detects an operation state of the electronic device 200, and converts the measured or detected information to an electronic signal. The sensor module 240 may include, for example, at least one of a gesture sensor 240A, an acceleration sensor 240B, an atmospheric pressure (barometric) sensor 240C, a magnetic sensor 240D, a gyro sensor 240E, a grip sensor 240F, a proximity sensor 240G, a color sensor 240H (for example, red, green, and blue (RGB) sensor) 240H, a biometric sensor 240I, a temperature/humidity sensor 240J, an illumination/illuminance (light) sensor 240K, and an ultra violet (UV) sensor 240M.

Additionally or alternatively, the sensor module 240 may include, for example, a E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240.

The input module 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet.

The key 256 may include, for example, a physical button, an optical key, or a key pad.

The ultrasonic input device 258 is a device which can detect an acoustic wave by a microphone (for example, a microphone 288) of the electronic device 200 through an input means generating an ultrasonic signal to identify data and can perform wireless recognition. According to an embodiment of the present disclosure, the electronic device 200 receives a user input from an external device (for example, computer or server) connected to the electronic device 200 by using the communication module 220.

The display 260 (for example, the display module 160 of FIG. 1) includes a panel 262, a hologram device 264, and a projector 266. The panel 262 may be, for example, an LCD or an AMOLED. The panel 262 may be implemented to be, for example, flexible, transparent, or wearable. The panel 262 may be configured by the touch panel 252 and one module.

The hologram device 264 shows a stereoscopic image in the air by using interference of light.

The projector 266 projects light on a screen to display an image. For example, the screen may be located inside or outside the electronic device 200. According to an embodiment of the present disclosure, the display 260 may further include a control circuit for controlling the panel 262, the hologram device 264, and the projector 266.

The interface 270 includes, for example, an HDMI 272, a USB 274, an optical interface 276, and a D-subminiature (D-sub) 278. The interface 270 may be included in, for example, the communication module 170 illustrated in FIG. 1. Additionally or alternatively, the interface 270 may include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the input output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment of the present disclosure, the camera module 291 may include one or more image sensors (for example, a front sensor or a back sensor), an image signal processor (ISP) (not shown) or a flash (for example, an LED or xenon lamp).

The power management module 295 manages power of the electronic device 200. Although not illustrated, the power management module 295 may include, for example, a power management IC (PMIC), a charger IC, or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment of the present disclosure, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery.

The indicator 297 shows particular statuses of the electronic device 200 or a part (for example, the AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a mobile TV. The processing unit for supporting the mobile TV may process, for example, media data according to a standard of digital multimedia broadcasting (DMB), digital video broadcasting (DVB), media flow or the like.

In the normal mode, the electronic device 200 may control elements 210 to 298 of the electronic device 200 using one or more processes. For example, in the normal mode, the electronic device 200 may control the elements thereof using one or more processes, and at this time, a low power process may be in the idle mode or in the off-state. The electronic device 200 may include one or more processes that operate in the normal mode, and the low power process that operates in the low power mode.

In the low power mode, the electronic device 200 may control the elements 210 to 298 using the low power process 180. For example, in the low power mode, the electronic device 200 may control the elements thereof using the low power process 180, and at this time, one or more processes rather than the low power process in the electronic device 100 may be in the idle mode or in the off-state. The low power mode, according to an embodiment of the present disclosure, may be an ALPM.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
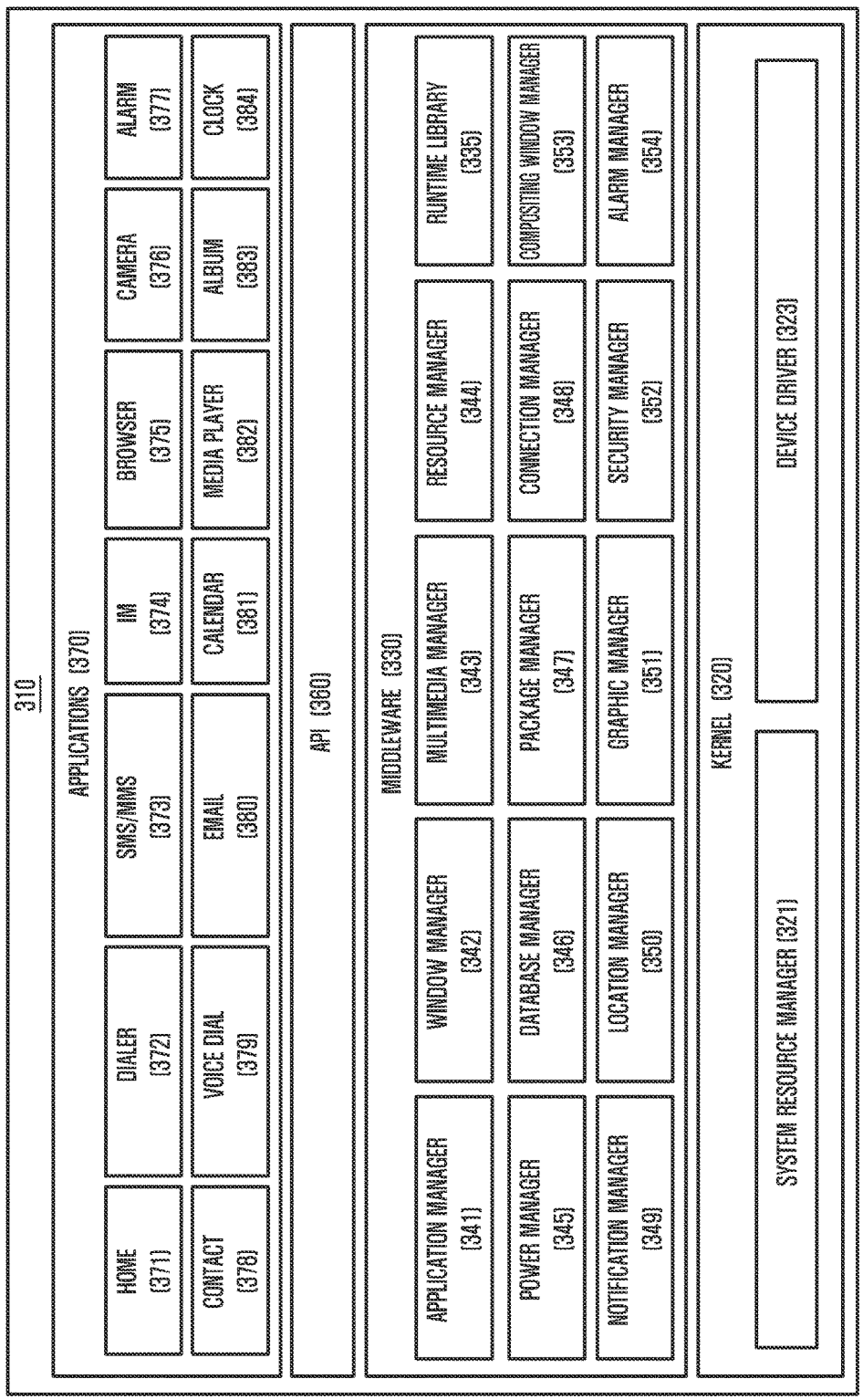
FIG. 3 is a block diagram of a program module according to an embodiment of the present disclosure.

FIG. 3 is a block diagram of a program module according to an embodiment of the present disclosure.

Referring to FIG. 3, a programming module 310 is illustrated, where the programming module 310 (e.g., the programming modules 140 of FIG. 1) may include an OS for controlling resources related to an electronic device (e.g., the electronic device 100 of FIG. 1), and/or various applications (e.g., the application 147) performed under the OS. The OS may be Android, iOS, Windows, Symbian, Tizen, Bada, or the like.

The programming module 310 may include a kernel 320, a middleware 330, an API 360, and/or applications 370. At least a part of the program module 310 may be pre-loaded in the electronic device, or may be downloaded from a server (e.g., the server 106 of FIG. 1).

The kernel 320 (e.g., the kernel 141 of FIG. 1) may include a system resource manager 321 or a device driver 323. The system resource manager 321 may perform the control, the allocation, or the collection of the system resources. According to an embodiment of the present disclosure, the system resource manager 321 may include a process management unit, a memory management unit, or a file system management unit. The device driver 323 may include, for example, a display driver, a camera driver, a BT driver, a common memory driver, a USB driver, a keypad driver, a Wi-Fi driver, an audio driver, or an inter-process communication (IPC) driver.

The middleware 330 may provide functions required in common for the applications 370, or may provide various functions to the applications 370 through the API 360 in order to allow the applications 370 to effectively use limited system resources in the electronic device. According to an embodiment of the present disclosure, the middleware 330 (e.g., the middleware 143 of FIG. 1) may include at least one of a run time library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, a compositing window manager 353, or an alarm manager 354.

The run time library 335 may include a library module that, for example, a compiler uses in order to add new functions through programming language while the applications 370 are being performed. The run time library 335 may perform functions of an input/output, the management of a memory, or arithmetic calculation.

The application manager 341 may manage, for example, a life cycle of at least one application among the applications 370.

The window manager 342 may manage a GUI resource used in the screen, and may manage a window. The window is a visual area that has a specific shape in the electronic device 100. The window may include various types of UIs, and at the same time, may allow inputs and display outputs with respect to one of the processes that are simultaneously executed. The window manager 342 may manage the placement where the window or the UI, which is created by the applications 370, is to be displayed on the display 160, or the appearance thereof. The window manager 342 may determine the placement where the window or the UI created by the applications 370 is displayed on the display 160, the size, the layout, or the sequence thereof.

The multimedia manager 343 may identify formats for reproducing various media files, and perform encoding or decoding of media files using a codec corresponding to each format.

The resource manager 344 may manage resources such as source codes, memories or storage spaces of one or more of the applications 370.

The power manager 345 may manage a battery or power by operating together with, for example, a basic input/output system (BIOS), and may provide power information necessary for the operation of the electronic device.

The database manager 346 may create, search for, or change a database that is to be used in at least one of the applications 370.

The package manager 347 may manage the installation or the updating of applications distributed in the form of a package file.

The connection manager 348 may manage wireless connection of, for example, Wi-Fi or BT.

The notification manager 349 may display or notify events, such as received messages, appointments, and proximity notifications, to a user without disturbance.

The location manager 350 may manage location information of the electronic device.

The graphic manager 351 may manage graphic effects to be provided to a user, or UIs related thereto.

The security manager 352 may provide a general security function required for system security or user authentication. According to an embodiment of the present disclosure, in the case of the electronic device (e.g., the electronic device 100) adopting a phone call function, the middleware 330 may further include a telephony manager for managing a function of voice-calling or video-calling in the electronic device.

The compositing window manager 353 may composite one or more windows or UIs, which is created by at least one of the applications 370, to thereby create one or more images to be displayed on the display 160. At this time, the window manager 353 may create the images by adding visual effects in addition to the compositing of the elements.

The alarm manager 354 may wake up the processes necessary for one or more of the applications 370 according to a predetermined period.

The middleware 330 may include a new middleware module through a combination of various functions of the above-described elements. The middleware 330 may provide modules specialized according to the type of OS in order to provide differentiated functions. In addition, some of the existing elements may be dynamically removed from the middleware 330, or new elements may be added to the middleware 330.

The API 360 (e.g., the API 145 of FIG. 1), for example, is a group of API programming functions, and may be provided with a different configuration according to an OS. For example, one set of APIs may be provided to each platform in the case of Android or iOS, and at least two sets of APIs may be provided to each platform in the case of Tizen.

The applications 370 (e.g., the application 147 of FIG. 1) may include, for example, one or more of a home application 371, a dialer application 372, an SMS/multimedia message service (MMS) application 373, an instant messaging (IM) application 374, a browser application 375, a camera application 376, an alarm application 377, a contact application 378, a voice dial application 379, an e-mail application 380, a calendar application 381, a media-player application 382, an album application 383, a clock application 384, an event application (not illustrated), a notification application (not illustrated), a healthcare application (e.g., measurement of the amount of exercise or blood sugar) (not illustrated), or an environmental information providing application (e.g., provision of information on atmosphere, humidity, or temperature) (not illustrated).

According to an embodiment of the present disclosure, the applications 370 may include an application (hereinafter, referred to as an "information-exchange application") that supports the exchange of information between the electronic device (e.g., the electronic device 100 of FIG. 1) and external electronic devices (e.g., the electronic devices 102 and 104 of FIG. 1). The information-exchange application may include, for example, a notification relay application for relaying specific information to the external electronic devices, or a device management application for managing the external electronic devices. In another embodiment, the electronic device 100 may exchange information with the external electronic devices (e.g., the electronic devices 102 and 104) using the event application or the notification application.

For example, the notification relay application may include a function of transferring notification information created in other applications (e.g., the SMS/MMS application, the e-mail application, the healthcare application, or the environmental information application) of the electronic device to the external electronic devices (e.g., the electronic devices 102 and 104). In addition, the notification relay application, for example, may receive notification information from the external electronic device, and may provide the same to a user. The device management application may manage (e.g., install, delete, or update), for example, one or more functions (e.g., turning on/off the external electronic devices (or some elements thereof), or adjusting the brightness (or the resolution) of the display thereof) of the external electronic device (e.g., the electronic device 104) that communicates with the electronic device, applications performed in the external electronic devices, or services (e.g., a phone call service or a messaging service) provided from the external electronic devices.

According to an embodiment of the present disclosure, the applications 370 may exchange information between the elements of the electronic device (e.g., the electronic device 100 of FIG. 1) through the event application or the notification application.

For example, the event application or the notification application may transfer notification information created in other applications (e.g., the SMS/MMS application, the email application, the healthcare application, or the environmental information application) of the electronic device to the elements of the electronic device 100. The electronic device 100 may output the information or may display the same through the display 260, using the event application or the notification application.

According to an embodiment of the present disclosure, the applications 370 may include applications that are designated according to the properties (e.g., a mobile medical device according to the type of electronic device) of the external electronic devices (e.g., electronic devices 102 and 104). According to an embodiment of the present disclosure, the applications 370 may include the applications received from the external electronic device (e.g., server 106, or the electronic devices 102 and 104). According to an embodiment of the present disclosure, the applications 370 may include pre-loaded applications or third party applications that are downloaded from the server. The names of the elements of the program module 310 may be variable according to the type of OS.

According to various embodiments of the present disclosure, the program module 310 may be implemented by software, firmware, hardware, or a combination thereof at least in part. At least some of the program module 310 may be implemented (e.g., executed), for example, by a processor (e.g., the AP 210 of FIG. 2). At least some of the program module 310 may include, for example, modules, programs, routines, the sets of instructions, or processes in order to execute one or more functions.

In the normal mode, the electronic device 100 of FIG. 1 may operate by configuring one or more programs in the program module 310 as the process. For example, in the normal mode, in order to display the UI of the clock application 384 on the display 160 of FIG. 1, the electronic device 100 may display the UI for a clock, which is created using one or more processes related to the window manager 342, the compositing window manager 353, or the alarm manager 354, on the display 160. In the low power mode, in order to display the UI of the clock application 384 on the display 160, the electronic device 100 may display the UI for a clock, using a single low power process (e.g., the ALPM processes) that includes the functions of the window manager 342, the compositing window manager 353, or the alarm manager 354, on the display 160.

Figure 4:
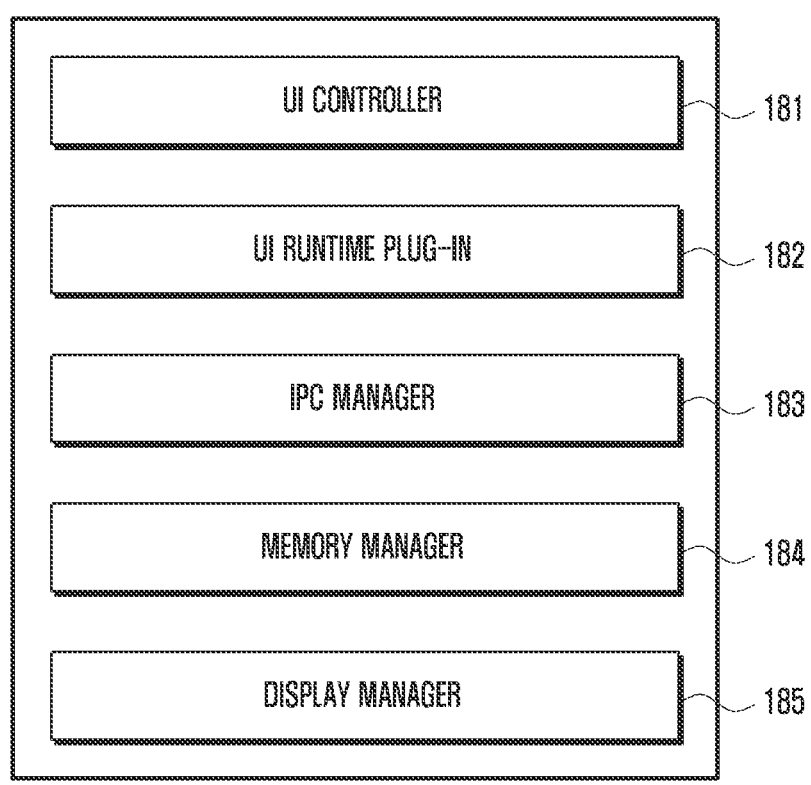
FIG. 4 is a block diagram of a low power process according to an embodiment of the present disclosure.

FIG. 4 is a block diagram of a low power process according to an embodiment of the present disclosure.

Referring to FIG. 4, a low power process 180 is illustrated, where the low power process 180 may include at least one of a UI controller 181, a UI runtime plug-in 182, an IPC manager 183, a memory manager 184, or a display manager 185.

The UI controller 181 may execute the functions of the window manager 342 of FIG. 3 and the compositing window manager 353 of FIG. 3 in the normal mode. In the low power mode, the UI controller 181 may reconfigure and composite the UI created from one or more of the applications 370 of FIG. 3.

In the low power mode, the UI runtime plug-in 182 may be a plug-in for creating a simplified UI and a UI for a low power mode.

When the low power mode is initiated at the beginning, the UI controller 181 and the UI runtime plug-in 182 may obtain information on the composite UI that is in progress (or which is being displayed) in the normal mode, and may create, load, or read information on the simplified UI to thereby allow the same to be displayed on the display 160 of FIG. 1.

After the simplified UI is displayed on the display 160, the UI controller 181 and the UI runtime plug-in 182 may allow the display 160 to display the UI for a low power mode, which is separate from the composite UI in progress (or, being displayed) in the normal mode.

The IPC manager 183 may provide methods or paths for transmitting and receiving data between the processes. For example, the IPC manager 183 may provide methods or paths for transmitting and receiving data between the UI controller 181, the UI runtime plug-in 182, the memory manager 184, or the display manager 185 in the low power process 180.

The memory manager 184 may call the data or the resources necessary for the UI or the low power process 180 from the memory 130, or may manage the same.

The display manager 185 may control the UI to be displayed on the display 160.

The electronic device 100 of FIG. 1 may determine whether or not the display 160 is converted into the low power mode. The electronic device 100 may include the low power process 180 that, when the display is converted from the normal mode into the low power mode, enables the simplified UI to be displayed on the display 160, which has at least some information identical to that of the UI, and has a lower quality than the UI by removing at least some information from the display image in the normal mode. In the simplified UI displayed by the electronic device 100 in the low power mode, the degree of simplicity of the UI displayed when entering the low power mode may be the same as the degree of simplicity of the UI displayed in the middle of the low power mode.

In an embodiment of the present disclosure, in the simplified UI displayed by the electronic device 100 in the low power mode, the degree of simplicity of the UI displayed when entering the low power mode may be different from the degree of simplicity of the UI displayed in the middle of the low power mode.

In an embodiment of the present disclosure, the low power process 180 may be a simplified process made by removing some functions from one or more processes that operate in the normal mode.

After displaying the simplified UI for a predetermined time, the low power process 180 may make a control to display a UI for a low power mode on the display 160, which has the same look and feel as the UI and has a lower quality than the simplified UI, and the some identical information or the some removed information may include at least one of a layout, fonts, lines, letters, colors, menus, buttons, boxes, dynamic factors, or shapes.

In the normal mode, one or more processes may make a control to create a main UI based on one or more applications, and to reconfigure the main UI to thereby create and display a composite UI.

The low power process 180 may collect information on the UI displayed in the normal mode, and may determine whether or not the simplified UI exists. If the simplified UI exists, the low power process 180 may load the simplified UI, and may perform rendering thereof to thereby determine the information to be displayed in the simplified UI. Then, the low power process 180 may display the simplified UI on the display 160.

In an embodiment of the present disclosure, the low power process 180 may collect the information on the UI displayed in the normal mode, and may determine whether or not the simplified UI exists. If the simplified UI exists, the low power process 180 may load the simplified UI. In addition, the low power process 180 may determine the information to be displayed in the simplified UI, and then may display the simplified UI on the display 160.

In an embodiment of the present disclosure, the UI displayed when the electronic device 100 is in the low power mode (e.g., the ALPM) may be referred to as the first simplified UI. The UI displayed when entering the low power mode, which is simpler than the UI of the normal mode, may be referred to as the second simplified UI. If the simplified UI does not exist, the low power process 180 may determine whether or not a simplified UI provided as a default is to be displayed, and if it is determined that the simplified UI provided as a default is to be displayed, the low power process 180 may load the same.

If it is determined that the simplified UI provided as a default is not to be displayed, the low power process 180 may create a simplified UI, based on the collected information on the UI displayed in the normal mode. The low power process 180 may determine the reception of a message or the occurrence of an event, and if the message is received or the event occurs, the low power process 180 may make a control to display the message or the event on the display 160 through the UI for a low power mode.

If no message is received or no event occurs, the low power process 180 may display the low power mode UI, which is being displayed, on the display 160. The low power process 180 may determine whether or not the low power UI continues to be displayed, and if it is determined that the low power UI continues to be displayed, the low power process 180 may load the low power UI and may display the same on the display 160.

If it is determined that the low power UI is to be terminated, the low power process 180 may call at least one process that can operate in the normal mode.

The electronic device, according to an embodiment of the present disclosure, may include: the display 160 of FIG. 1; and the processor 120 of FIG. 1 that determines whether or not the mode is converted into a low power mode, and makes a control to display a UI on the display 160, wherein the processor 120, if the mode is converted into the low power mode, displays the first simplified UI, which has at least some information identical to that of the UI, and is configured by removing at least some information from the image displayed in the normal mode, on the display 160.

In an embodiment of the present disclosure, the processor 120 may display the first simplified UI on the display 160 using a process that is made by simplifying or compositing at least some functions of one or more processes used in displaying the UI.

In an embodiment of the present disclosure, the processor 120 may configure the second simplified UI, and may configure the first simplified UI based on the second simplified UI to thereby display the same on the display.

In an embodiment of the present disclosure, the processor 120 may display the first simplified UI on the display 160 after displaying the second simplified UI for a predetermined time.

In an embodiment of the present disclosure, the processor 120: may collect information on the UI displayed in the normal mode; may determine whether or not the second simplified UI exists; if the second simplified UI exists, may load the second simplified UI; and may determine information constituting the second simplified UI to thereby configure the first simplified UI.

In an embodiment of the present disclosure, the processor 120: if the second simplified UI does not exist, may determine whether or not the second simplified UI provided as a default is to be displayed; and if it is determined that the second simplified UI provided as a default is to be displayed, may load the second simplified UI provided as a default.

In an embodiment of the present disclosure, the processor 120, if it is determined that the second simplified UI provided as a default is not to be displayed, may configure the first simplified UI based on the collected information on the UI configured in the normal mode.

In an embodiment of the present disclosure, the processor 120, if it is determined that the second simplified UI provided as a default is not to be displayed, may configure the first simplified UI based on UI elements included in the electronic device 100.

In an embodiment of the present disclosure, the processor 120: may determine whether or not a message is received or an event occurs; and if the message is received or the event occurs, may display the message or the event through the first simplified UI on the display 160.

In an embodiment of the present disclosure, the processor 120: may determine whether or not the first simplified UI continues to be displayed; if it is determined that the first simplified UI continues to be displayed, may load the first simplified UI; and may display the first simplified UI on the display 160.

In an embodiment of the present disclosure, the processor 120: if it is determined that one or more processes are woken up to display the UI, may call one or more processes used in displaying the UI; may load a UI for a normal mode; and may display the UI for a normal mode.

Figure 5:
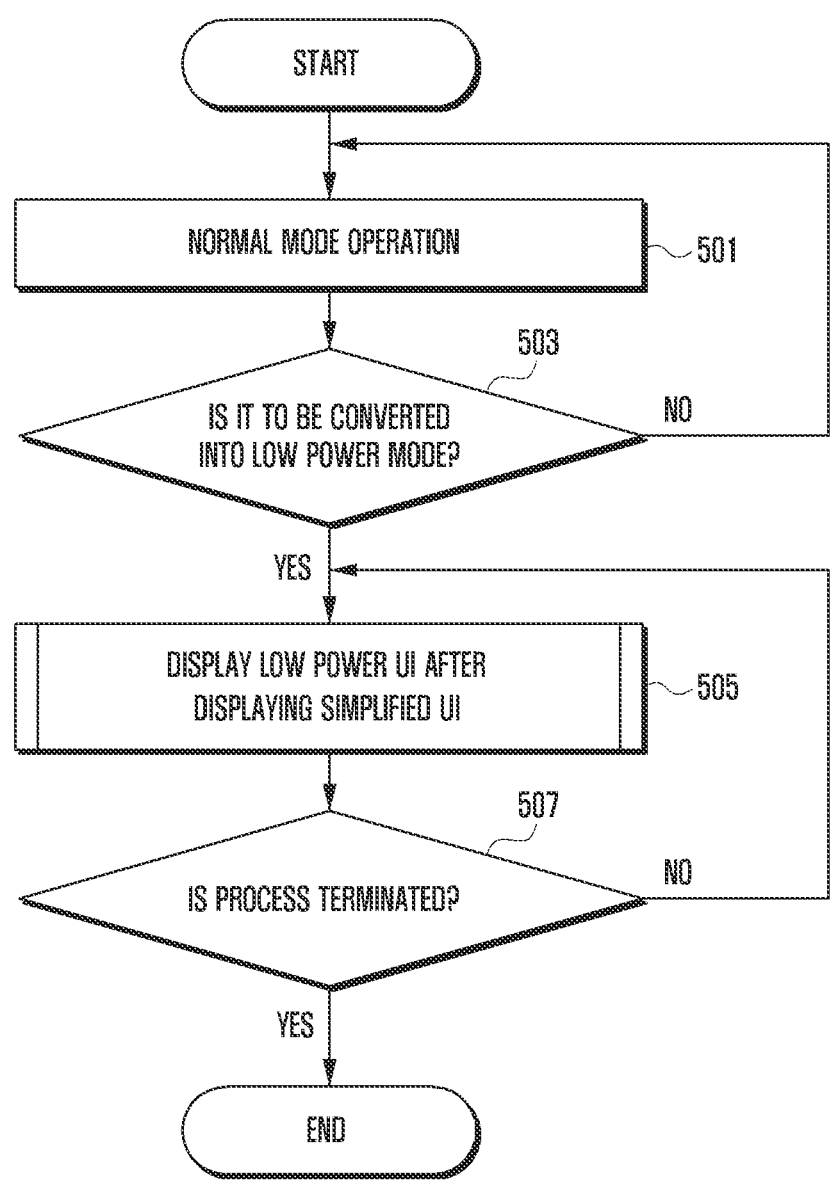
FIG. 5 is a flowchart of a method for displaying a user interface of an electronic device in a normal mode according to an embodiment of the present disclosure.

FIG. 5 is a flowchart of a method for displaying the UI of an electronic device according to an embodiment of the present disclosure.

Referring to FIG. 5, a flowchart is illustrated, in which the electronic device 100 as illustrated in FIG. 1 may operate in a normal mode in operation 501. A power mode of the electronic device 100, according to an embodiment of the present disclosure, may be configured to include a normal mode and a low power mode, or include a normal mode and an ALPM, according to the using environment. The ALPM may be the same as the low power mode. The electronic device 100 may include one or more processes that operate in the normal mode, and a low power process that operates in the low power mode.

The normal mode refers to a mode in which the electronic device 100 operates in the general condition. The user may freely use the electronic device 100 for all of the functions in the normal mode. The low power mode limits all of functions of the electronic device 100 except for some of them to thereby minimize the power consumption of a battery 296 of FIG. 2. In the low power mode according to an embodiment of the present disclosure, the electronic device 100 can display information through the display 160 of FIG. 1 as well. However, there may be a discrepancy in the resolution or the quality of the image displayed through the display 160 between the normal mode and the low power mode, that is, the resolution or the quality of the image displayed through the display 160 in the low power mode may be lower than that of the image displayed through the display 160 in the normal mode.

For example, when the electronic device 100 operates in the normal mode as in operation 501, the resolution or the quality of the image displayed through the display 160 is not limited, so that the information may be displayed at a resolution or with the quality, which is configured by the user or the manufacturer.

The electronic device 100 may configure the resolution or the quality of the information displayed on the display 160 in the low power mode to be lower than that in the normal mode, and may configure the brightness of the display 160 in the low power mode to be lower than that in the normal mode as well.

The electronic device 100 may control the brightness of the display 160 in the low power mode to be lower than that in the normal mode by controlling the power supplied to the backlight of the display 160.

When the electronic device 100 operates in the normal mode in operation 501, the electronic device 100 may display the normal mode UI on the display 160.

The electronic device 100 may determine whether or not the normal mode is to be converted into the low power mode in operation 503. If it is determined that the normal mode is not to be converted into the low power mode, the electronic device 100 may return to operation 501.

In an embodiment of the present disclosure, if no input or no event is received for a predetermined time in the normal mode, the electronic device 100 may be converted from the normal mode into the low power mode.

In an embodiment of the present disclosure, when an input for the conversion from the normal mode into the low power mode is received, the electronic device 100 may be converted from the normal mode into the low power mode. For example, the input for the conversion from the normal mode into the low power mode may include a touch event for the conversion into the low power mode through a touch panel 252 of FIG. 2, or an input for the conversion into the low power mode through the key 256 of FIG. 2.

When the electronic device 100 is to be converted into the low power mode, the electronic device 100 may display the simplified UI, or may display the low power UI (e.g., the first simplified UI) after displaying the simplified UI (e.g., the second simplified UI) in operation 505.

At least some information of the simplified UI may be the same as the information of the UI displayed in the normal mode while at least some information displayed in the normal mode is removed from the simplified UI, and the quality of the simplified UI may be lower than that of the UI displayed in the normal mode.

The same information above may include at least one of a layout, fonts, lines, letters, colors, menus, buttons, boxes, dynamic factors, or shapes. The removed information above may include at least one of a layout, fonts, lines, letters, colors, menus, buttons, boxes, dynamic factors, or shapes.

The resolution or the quality of a window or an image of the simplified UI may be lower than that of the normal mode UI, and may be higher than that of the low power UI. For example, the resolution or the quality of the window or the image may decrease in an order of the normal mode UI, the simplified UI, and then the low power UI.

The simplified UI may be created in advance, based on the normal mode UI, to be thereby stored in the memory 130 of FIG. 1 of the electronic device 100, or may be created during the running time to be thereby stored in the memory 130 for later use.

In the case where the simplified UI is preliminarily created and stored in the memory 130, the low power process 180 of FIG. 4 needs to load the normal mode UI, which is preliminarily created and stored in the memory 130, when the normal mode UI is converted into the simplified UI.

In the case where the simplified UI is created during the running time and stored in the memory, the low power process 180 may require an additional operation of transforming the normal mode UI into the simplified UI (e.g., the second simplified UI).

The normal mode UI, the simplified UI, and the low power UI may have the same or the similar look and feel except that they are different from each other only in the resolution or the quality thereof.

The term "look and feel", which is used in the software design, refers to a GUI design that shows the "look," such as colors, shapes, a layout, or fonts, and the "feel" that means the operation of dynamical factors, such as buttons, boxes, or menus.

The electronic device 100 may determine whether or not the process is terminated in operation 507. In an embodiment of the present disclosure, the electronic device 100 may determine whether or not the low power process 180 is terminated. When an input for terminating the low power process 180 is received, the electronic device 100 may terminate the low power process 180. For example, the input for terminating the low power process 180 may include the touch event for the conversion of the low power mode through the touch panel 252, or the input for the conversion of the low power mode through the key 256.

In an embodiment of the present disclosure, if no input or no event is received for a predetermined time in the low power mode, the electronic device 100 may terminate the low power process 180.

When the input for terminating the process is received, or when no input or no event is received for a predetermined time, the electronic device 100 may terminate the low power process 180, or may convert the low power process 180 into an idle mode. When the low power process 180 is converted into the idle mode, the display 160 is turned off, and all of the functions except for some functions (e.g., a receiving function, or a data receiving function) are restricted to thereby minimize the power consumption of the battery 296 of FIG. 1.

If it is determined that the process is not terminated, the electronic device 100 may return to operation 505. At this time, before returning to operation 505, the electronic device 100 may organize resources and may enter the background mode.

Figure 6:
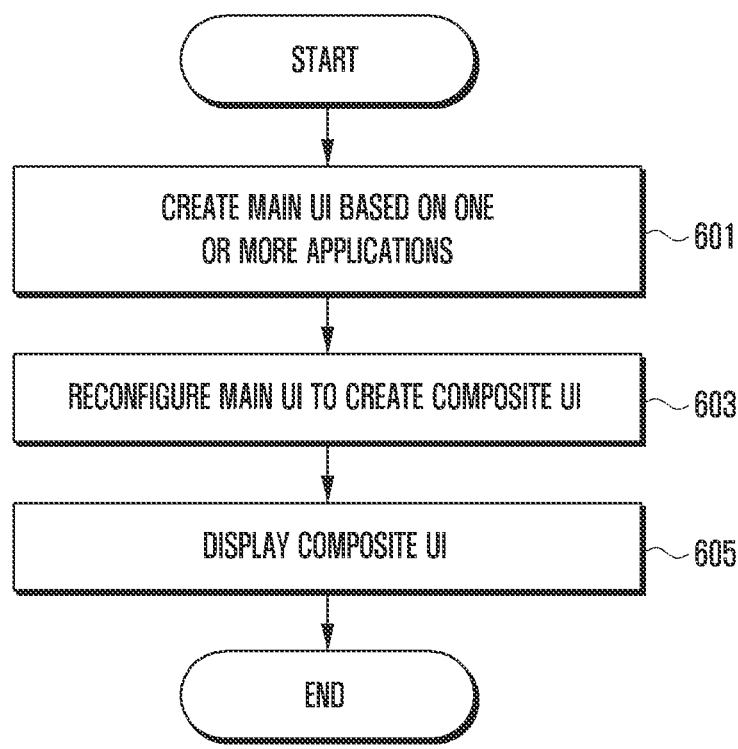
FIG. 6 is a flowchart illustrating a method for displaying a user interface of an electronic device in a normal mode according to an embodiment of the present disclosure.

FIG. 6 is a flow chart illustrating a method for displaying the UI of an electronic device in a normal mode according to an embodiment of the present disclosure.

Referring to FIG. 6, a flowchart is illustrated, in which the electronic device 100 of FIG. 1 may create the main UI based on one or more applications 370 in the normal mode, in operation 601. In an embodiment of the present disclosure, the electronic device 100 may create the main UI based on one or more processes in the normal mode, in operation 601.

For example, the main UI may be created by using the clock application 384 of FIG. 3, the album application 383 of FIG. 3, an event application, or messages applications, such as a notification application, the SMS/MMS application 373 of FIG. 3, or the IM application 374 of FIG. 3. At this time, the clock application 384, which requires a period, may receive a period configured through the alarm manager 354 of FIG. 3. For example, the process configuration period of the clock application 384 may be once a minute. The middleware 330 of FIG. 3 or the applications 370 of FIG. 3, which are involved in creating the UI, may be regarded as the process. The electronic device 100 may execute functions (e.g., creating the UI) using one or more processes in the normal mode, and the electronic device 100 may execute functions using the low power process.

The electronic device 100 may reconfigure the main UI in the normal mode to make a composite UI, in operation 603.

The main UI created in one or more of the applications 370 may be determined for the position where the main UI is to be displayed on the display 160 of FIG. 1, or the appearance thereof through the window manager 342 of FIG. 3. The window manager 342 may have the information on the position where the main UI created in one or more of the applications 370 is to be displayed on the display 160, or the appearance thereof, in advance.

When the position where the main UI is to be displayed on the display 160, or the appearance thereof is determined through the window manager 342, the compositing window manager 353 of FIG. 3 may create a composite UI by compositing one or more main UIs, or by giving visual effects to one or more main UIs.

The electronic device 100 may display the composite UI on the display 160 in the normal mode, in operation 605. When the composite UI is displayed on the display 160, the electronic device 100 may display the UI that is composited by a control circuit (e.g., a display controller) included in the display 160 or the processor 120, on the display 160.

For example, with regard to the clock application 384, when the clock application 384 creates the main UI for a clock according to a setup period of the alarm manager 354, the window manager 342 may determine the position where the main UI for a clock is to be displayed on the display 160 and the appearance thereof. When the position where the main UI for a clock is to be displayed on the display 160 and the appearance thereof are determined through the window manager 342, the compositing window manager 353 may create a composite UI for a clock by compositing the main UI for a clock and the UI of another application, or by giving visual effects to the main UI for a clock, and the electronic device 100 may allow the display 160 to display the composite UI for a clock.

Figure 7:
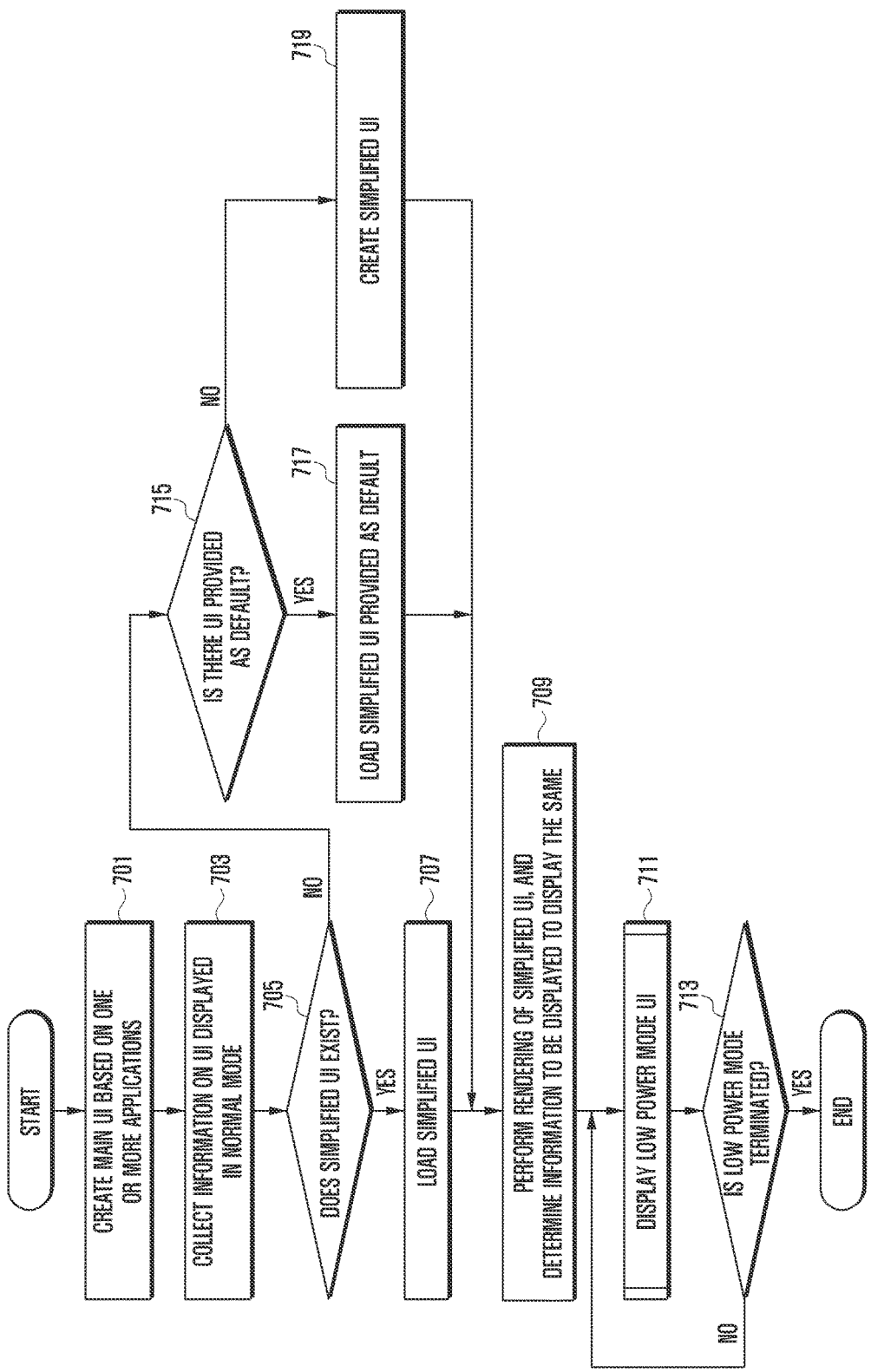
FIG. 7 is a flowchart of a method for displaying a user interface of an electronic device in a low power mode according to an embodiment of the present disclosure.

FIG. 7 is a flowchart of a method for displaying a UI of an electronic device in a low power mode according to an embodiment of the present disclosure. FIG. 7 may be a detailed flowchart of the operation 405 in FIG. 4.

Referring to FIG. 7, a method for displaying a UI of the electronic device 100 of FIG. 1 is illustrated, where the electronic device 100 may create a main UI based on one or more of the applications 370 of FIG. 3 in a low power mode, in operation 701. In an embodiment of the present disclosure, the electronic device 100 may create the main UI based on one or more processes in the low power mode, in operation 701.

The electronic device 100 may collect information on the UI displayed in a normal mode in operation 703.

The electronic device 100 may determine whether or not a simplified UI exists in operation 705.

If the simplified UI exists in operation 705, the electronic device 100 may load the simplified UI in operation 707.

In operation 709, the electronic device 100 may perform rendering of the simplified UI, and may determine information to be displayed in the simplified UI to thereby display the simplified UI. The simplified UI may be displayed for a predetermined time. In an embodiment of the present disclosure, the electronic device 100 may display the simplified UI after determining the information to be displayed in the simplified UI, in operation 709.

In operation 711, the electronic device 100 may display the low power mode UI (e.g., the first simplified UI). The electronic device 100 may perform rendering of the simplified UI (e.g., the second simplified UI) through the low power process 180 of FIG. 4, and may allow the simplified UI to be displayed on the display 160 of FIG. 1 under the control of the low power process 180. The simplified UI may be stored in the memory 130 of FIG. 1 in advance according to the user's selection. In an embodiment of the present disclosure, the electronic device 100 may enable the simplified UI (e.g., the second simplified UI) to be displayed on the display 160 under the control of the low power process 180.

In operation 713, the electronic device 100 may determine whether or not the low power mode is terminated. When an input for terminating the low power mode is received, the electronic device 100 may terminate the low power mode and the method of FIG. 7 ends. If the low power mode is not terminated, the electronic device 100 may return to operation 711 to thereby display the low power mode UI.

If the simplified UI does not exist in operation 705, the electronic device 100 may determine whether or not there is data by which the simplified UI provided as a default is to be displayed, in operation 715.

If it is determined that there is data by which the simplified UI provided as a default is to be displayed, the electronic device 100 may load the simplified UI provided as a default in operation 717, and may return to operation 709.

If it is determined that there is no data by which the simplified UI provided as a default is to be displayed, the electronic device 100 may create a simplified UI based on the collected information on the UI displayed in the normal mode in operation 719, and may return to operation 709. The electronic device 100 may create the simplified UI based on the information on the UI displayed in the normal mode, using the low power process 180.

According to various embodiments of the present disclosure, in a case where a clock is displayed in the normal mode, and it is determined that there is no data for the simplified UI provided as a default, if there is a resource (e.g., a winset) that can be displayed, it can be created instead of the same.

For example, numbers may be extracted from the clock in the normal mode, and may be replaced with the same number fonts having similar shapes among winsets of the electronic device 100. After that, they may be additionally adjusted in the size.

Figure 8:
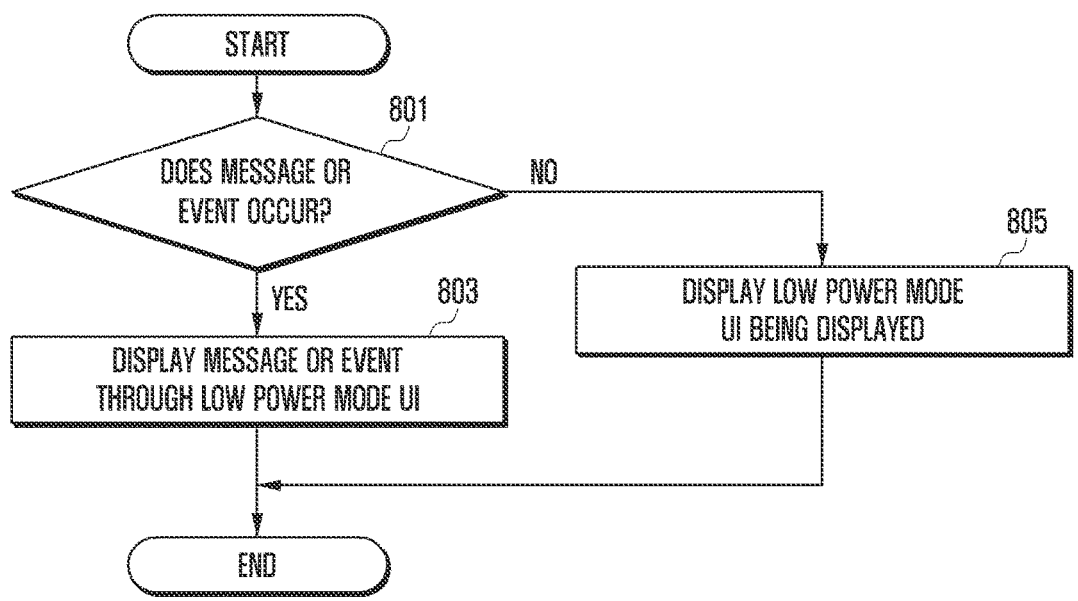
FIG. 8 is a flowchart of a method for displaying a user interface of an electronic device in a low power mode when an event occurs according to an embodiment of the present disclosure.

FIG. 8 is a flowchart of a method for displaying a UI of tan electronic device in a low power mode when an event occurs according to an embodiment of the present disclosure.

Referring to FIG. 8, a method for displaying a UI of the electronic device 100 of FIG. 1 in a low power mode when an event occurs is illustrated, where the method of FIG. 8 may correspond to the operation following the operation 711 of FIG. 7.

The electronic device 100 may determine whether or not the message is received through the communication interface 170 of FIG. 1, or the event, such as the case where it is the time determined through the alarm application 377 of FIG. 3, the event application of FIG. 3, or the notification application of FIG. 3, occurs while displaying the low power mode UI (e.g., the first simplified UI) in the low power mode, in operation 801.

When the message is received or the event occurs, the electronic device 100 may display the message or event information through the low power mode UI in operation 803. When displaying the message or event information through the low power mode UI, the display may remain in the ALPM mode, and may not be converted into the normal mode.

For example, when the message is received through the communication interface 170 of FIG. 1, the low power process 180 of FIG. 4 may reconfigure and composite the main UI created in the SMS/MMS application 373 of FIG. 3 or the IM application 374 of FIG. 3 to thereby create the low power mode UI with respect to the SMS/MMS application 373 or the IM application 374, and may display the same on the display 160 of FIG. 1.

When no message is received or no event occurs, the electronic device 100 may continue to display the low power mode UI that is being displayed in operation 805.

Figure 9:
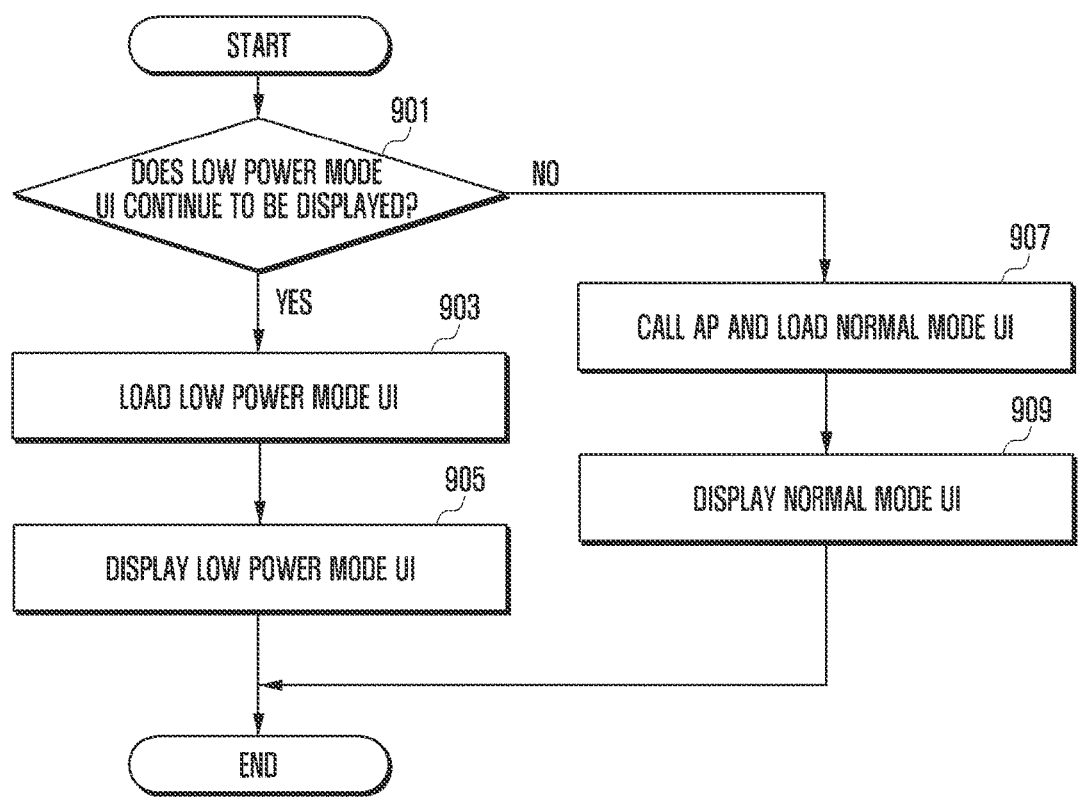
FIG. 9 is a flowchart of a method for converting a user interface of an electronic device according to an embodiment of the present disclosure.

FIG. 9 is a flowchart of a method for converting a UI of the electronic device 100 of FIG. 1 according to an embodiment of the present disclosure. The method for converting the UI of the electronic device in FIG. 9 may correspond to the operation following the operation 713 of FIG. 7.

Referring to FIG. 9, a method for converting a UI of the electronic device 100 of FIG. 1 is illustrated, where the electronic device 100 may determine whether or not low power mode UI information continues to be displayed in operation 901. For example, when an input for terminating the low power mode is received, the electronic device 100 may terminate the low power mode or the low power process.

If the low power mode UI information continues to be displayed, that is, if the low power mode is not terminated, the electronic device 100 may load the low power mode UI in operation 903.

In operation 905, the electronic device 100 may display the low power mode UI through the display 160 of FIG. 1.

If the low power mode UI information does not continue to be displayed, that is, if the low power mode is terminated in operation 901, the electronic device 100 may call one or more processes, which operate in the normal mode, through the AP 210 of FIG. 2, and may load a normal mode UI through one or more processes, which operate in the normal mode, in operation 907.

In operation 909, the electronic device 100 may display the normal mode UI through the display 160.

Figure 10:
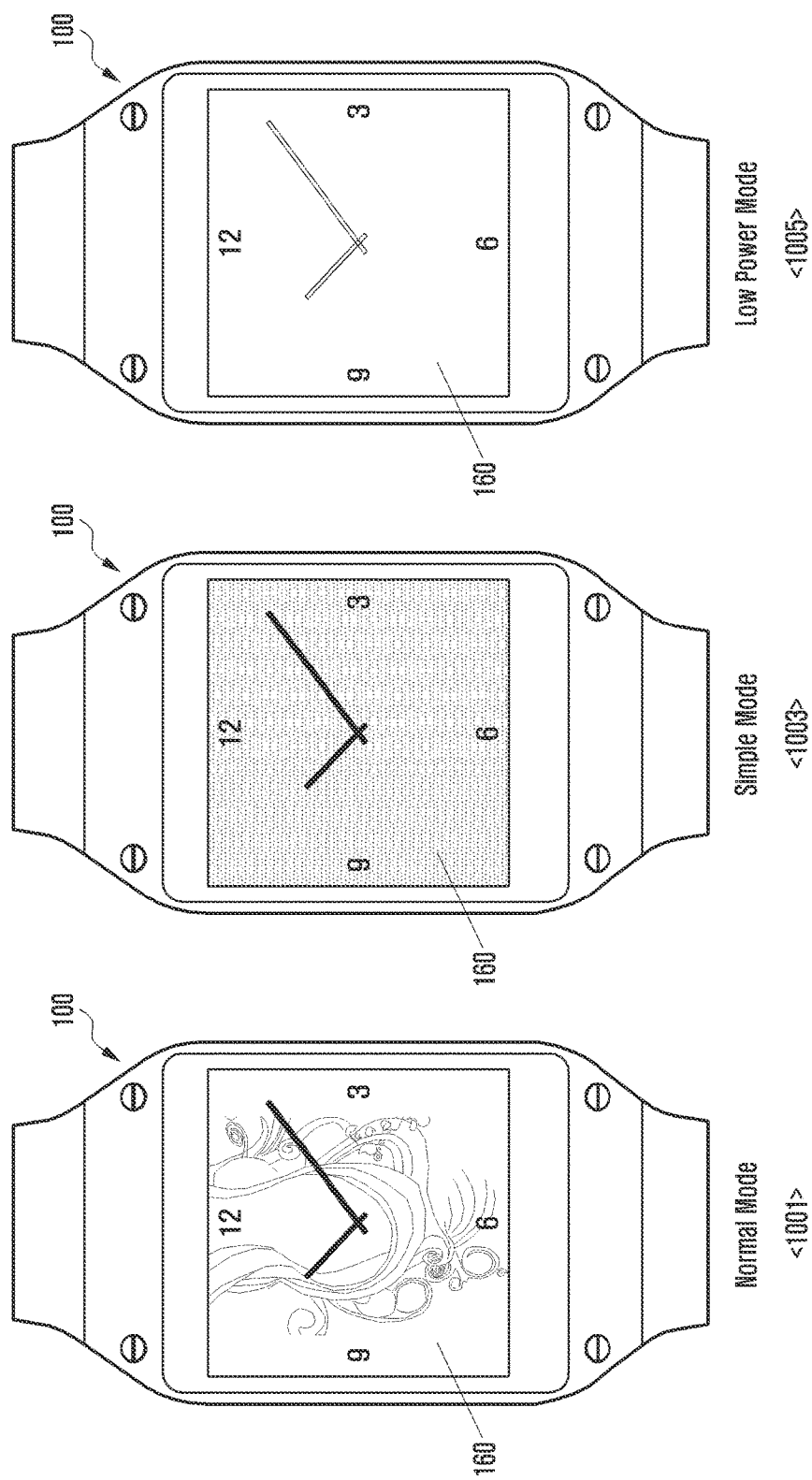
FIG. 10 illustrates an example of images of a user interface of an electronic device in a normal mode, a simple mode and a low power mode according to an embodiment of the present disclosure.

FIG. 10 illustrates an example of images of UIs of an electronic device in a normal mode, a simple mode and a low power mode according to an embodiment of the present disclosure.

Referring to FIG. 10, diagrams 1001, 1003, and 1005 are illustrated to show UIs of an electronic device 100 for displaying a clock, which have the same look and feel in which the hour hand and the minute hand are expressed as a GUI factor, and the hours are expressed as Arabic numerals in a three-hour unit, such as three, six, nine, and twelve.

In diagram 1001, the electronic device 100 may display the clock UI on a display 160 in the normal mode. The clock UI in the normal mode is not limited to specific colors.

When the electronic device 100 is converted from the normal mode into a low power mode, the electronic device 100 may display the simplified clock UI for a predetermined time, and then may display the clock UI for a low power mode.

In diagram 1003, the electronic device 100 may simplify the clock UI in a simplified mode to thereby display the same on the display 160. In other words, the electronic device 100 may display the simplified clock UI on the display 160. The simplified clock UI may be limited to specific colors, that is, it may be limited to fewer colors than the clock UI for a normal mode, or the resolution or the quality thereof may be lower than the same.

In diagram 1005, the electronic device 100 may display the clock UI for a low power mode on the display 160. The low power mode clock UI may be limited to fewer colors than the simplified clock UI, or the resolution or the quality thereof may be lower than the same.

FIG. 11 illustrates an example of images of UIs of an electronic device in a normal mode, a simple mode and a low power mode according to an embodiment of the present disclosure.

Referring to FIG. 11, diagrams 1101, 1103, and 1105 are illustrated to show UIs of an electronic device for displaying (on a display 160) a clock, which have the same look and feel in which the hour and the minute are expressed as digital numbers of a GUI factor while displaying "AM," or "PM" in the lower left side of the GUI factor of the hour and the minute. Diagram 1101 of FIG. 11 shows the clock UI for a normal mode, diagram 1103 shows the clock UI for a simple mode, and diagram 1105 shows the clock UI for a low power mode. The order of the resolution, the quality, or the colors with respect to the normal mode clock UI, the simplified clock UI, and the low power mode clock UI of FIG. 11 may follow the same rule as FIG. 10.

FIG. 12 illustrates an example of images of UIs of an electronic device in a normal mode, a simple mode and low power mode according to an embodiment of the present disclosure.

Referring to FIG. 12, diagrams 1201, 1203, and 1205 are illustrated to show UIs of an electronic device 100 for displaying (on a display 160) photos, which have the same look and feel when the user configures photos included in the album application 383 of FIG. 3 to be displayed in a low power mode. Diagram 1201 of FIG. 12 shows the photo UI for a normal mode, diagram 1203 shows the photo UI for a simplified mode, and diagram 1205 shows the photo UI for a low power mode. The order of the resolution, the quality, or the colors with respect to the normal mode photo UI, the simplified photo UI, and the low power mode photo UI of FIG. 12 may follow the same rule as FIG. 10.

FIG. 13 illustrates an example of images of UIs of an electronic device in a normal mode, a simplified mode and a low power mode according to an embodiment of the present disclosure.

Referring to FIG. 13, diagrams 1301, 1303, and 1305 are illustrated to show UIs of an electronic device 100 for displaying (on a display 160) messages or events, which have the same look and feel when the user configures messages or events to be displayed in a low power mode. Diagram 1301 of FIG. 13 shows the UI for messages or events in a normal mode, diagram 1303 shows the UI for messages or events in a simple mode, and diagram 1305 shows the UI for messages or events in the low power mode. The UI for messages or events of FIG. 13 may be displayed by graphically processing the text as bubbles. The order of the resolution, the quality, or the colors with respect to the UI for messages or events in the normal mode, the simplified UI for messages or events, and the UI for messages or events in the low power mode of FIG. 13 may follow the same rule as FIG. 10.

According to various embodiments of the present disclosure, only the text may be displayed without graphically processing the same as bubbles, according to the characteristics of the messages or the events. The text may be displayed in an order of reception in order to recognize the reception sequence. Alternatively, the text may be replaced with signs like bubbles. The text may be replaced with the signs, such as '(',')', '[',']', '{','}', which are similar to the bubbles.

A method of displaying a UI on an electronic device in a low power mode, according to an embodiment of the present disclosure, may include displaying the UI in a normal mode, determining whether or not the normal mode is converted into the low power mode, and if the normal mode is converted into the low power mode, displaying a first simplified UI, which has at least some information identical to that of the UI, and is configured by removing at least some information from an image displayed in the normal mode.

In an embodiment of the present disclosure, the method may further include displaying the first simplified UI using a process that is made by simplifying or compositing at least some functions of one or more processes used in displaying the UI.

In an embodiment of the present disclosure, the displaying of the first simplified UI may include configuring a second simplified UI, and configuring the first simplified UI based on the second simplified UI to thereby display the same.

In an embodiment of the present disclosure, the first simplified UI may be displayed after displaying the second simplified UI for a predetermined time.

In an embodiment of the present disclosure, the at least some identical information or the at least some removed information may include at least one of a layout, fonts, lines, letters, colors, menus, buttons, boxes, dynamic factors, and shapes.

In an embodiment of the present disclosure, the displaying of the simplified UI may include collecting information on the UI displayed in the normal mode, determining whether or not the second simplified UI exists, if the second simplified UI exists, loading the second simplified UI, and determining information constituting the second simplified UI to thereby configure the first simplified UI.

In an embodiment of the present disclosure, the method may further include if the second simplified UI does not exist, determining whether or not the second simplified UI provided as a default is to be displayed, and if it is determined that the second simplified UI provided as a default is to be displayed, loading the second simplified UI provided as a default.

In an embodiment of the present disclosure, the method may further include, if it is determined that the second simplified UI provided as a default is not to be displayed, configuring the first simplified UI based on the collected information on the UI configured in the normal mode.

In an embodiment of the present disclosure, the method may further include, if it is determined that the second simplified UI provided as a default is not to be displayed, configuring the first simplified UI based on UI elements included in an electronic device.

In an embodiment of the present disclosure, the method may further include determining whether or not a message is received or an event occurs, and if the message is received or the event occurs, displaying the message or the event through the first simplified UI.

In an embodiment of the present disclosure, the method may further include determining whether or not the first simplified UI continues to be displayed, and if it is determined that the first simplified UI continues to be displayed, loading the first simplified UI and displaying the first simplified UI.

In an embodiment of the present disclosure, the method may further include if it is determined that one or more processes are woken up to display the UI, calling one or more processes used in displaying the UI, loading the UI for the normal mode, and displaying the UI for the normal mode.

The term "module" used in the present disclosure may refer to, for example, a unit including one or more combinations of hardware, software, and firmware. The "module" may be interchangeably used with, for example, the term "unit," "logic," "logical block," "component," or "circuit." The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific IC (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the instruction is executed by at least one processor (for example, the processor 120 of FIG. 1), the at least one processor may execute a function corresponding to the instruction. The computer-readable storage medium may be, for example, the memory 130 of FIG. 1.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to various embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying a user interface on an electronic device, the method comprising:
    displaying, on the electronic device, the user interface in a normal mode;

determining whether the normal mode is converted into a low power mode; and if the normal mode is converted into the low power mode, displaying a first simplified user interface, wherein the first simplified user interface is identical or similar to at least one of dynamic factors of the user interface in the normal mode and shapes included in an entire screen of the user interface in the normal mode, and wherein the user interface, the first simplified user interface, and a second simplified user interface comprise a clock interface.

2. The method of claim 1, further comprising displaying the first simplified user interface using a process to simplify or composite at least some functions of one or more processes used in displaying the user interface in the normal mode.

3. The method of claim 1,
wherein the displaying of the first simplified user interface comprises:
configuring the second simplified user interface, and
configuring the first simplified user interface based on the second simplified user interface, and
wherein the second simplified user interface is identical or similar to a layout, fonts, lines, letters, colors, menus, buttons, boxes, dynamic factors and shapes of the user interface in the normal mode.

4. The method of claim 3, wherein, in the displaying of the first simplified user interface, the first simplified user interface is displayed after displaying the second simplified user interface for a predetermined time.

5. The method of claim 3, wherein the displaying of the first simplified user interface comprises:
collecting information on the user interface displayed in the normal mode;
determining whether the second simplified user interface exists;
if the second simplified user interface exists, loading the second simplified user interface; and
determining information constituting the second simplified user interface to thereby configure the first simplified user interface.

6. The method of claim 5, further comprising:
if the second simplified user interface does not exist, determining whether the second simplified user interface provided as a default is to be displayed;
if it is determined that the second simplified user interface provided as the default is to be displayed, loading the second simplified user interface provided as the default; and
if it is determined that the second simplified user interface provided as the default is not to be displayed, configuring the first simplified user interface based on the collected information on the user interface configured in the normal mode and configuring the first simplified user interface based on user interface elements included in the electronic device.

7. The method of claim 3, further comprising:
determining whether a message is received or an event occurs, and
if the message is received or the event occurs, displaying the message or the event through the first simplified user interface.

8. The method of claim 3, further comprising:
determining whether the first simplified user interface continues to be displayed, and if it is determined that the first simplified user interface continues to be displayed, loading the first simplified user interface and displaying the first simplified user interface.

9. The method of claim 1, wherein the first simplified user interface is further identical or similar to at least one of a layout, fonts, lines, letters, colors, menus, buttons, and boxes of the user interface in the normal mode or the second simplified user interface.

10. The method of claim 1, further comprising:
if it is determined that one or more processes are woken up to display the user interface, calling one or more processes used in displaying the user interface;
loading the user interface in the normal mode; and
displaying the user interface in the normal mode.

11. An electronic device for displaying a user interface, the electronic device comprising:
a display; and
a processor configured to:
display the user interface on the display in a normal mode,
determine whether the normal mode is converted into a low power mode, and
if the normal mode is converted into the low power mode, display, on the display, a first simplified user interface,
wherein the first simplified user interface is identical or similar to at least one of dynamic factors of the user interface in the normal mode and shapes included in an entire screen of the user interface in the normal mode, and
wherein the user interface, the first simplified user interface, and a second simplified user interface comprise a clock interface.

12. The electronic device of claim 11, wherein the processor is further configured to display the first simplified user interface on the display using a process to simplify or composite at least some functions of one or more processes used in displaying the user interface in the normal mode.

13. The electronic device of claim 11,
wherein the processor is further configured to:
configure the second simplified user interface, and
configure the first simplified user interface based on the second simplified user interface, and
wherein the second simplified user interface is identical or similar to a layout, fonts, lines, letters, colors, menus, buttons, boxes, dynamic factors and shapes of the user interface in the normal mode.

14. The electronic device of claim 13, wherein the processor is further configured to display the first simplified user interface on the display after displaying the second simplified user interface for a predetermined time.

15. The electronic device of claim 13, wherein the processor is further configured to:
collect information on the user interface displayed in the normal mode,
determine whether the second simplified user interface exists,
if the second simplified user interface exists, load the second simplified user interface, and
determine information constituting the second simplified user interface to thereby configure the first simplified user interface.

16. The electronic device of claim 15, wherein the processor is further configured to:

if the second simplified user interface does not exist, determine whether the second simplified user interface provided as a default is to be displayed, if it is determined that the second simplified user interface provided as the default is to be displayed, load the second simplified user interface provided as the default, and if it is determined that the second simplified user interface provided as a default is not to be displayed, configure the first simplified user interface based on the collected information on the user interface configured in the normal mode and configure the first simplified user interface based on user interface elements included in the electronic device.

17. The electronic device of claim 11, wherein the first simplified user interface is further identical or similar to at least one of a layout, fonts, lines, letters, colors, menus, buttons, and boxes of the user interface in the normal mode or the second simplified user interface.

18. The electronic device of claim 13, wherein the processor is further configured to:

determine whether a message is received or an event occurs, and if the message is received or the event occurs, display the message or the event through the first simplified user interface on the display.

19. The electronic device of claim 13, wherein the processor is further configured to:

determine whether the first simplified user interface continues to be displayed, if it is determined that the first simplified user interface continues to be displayed, load the first simplified user interface, and display the first simplified user interface on the display.

20. The electronic device of claim 11, wherein the processor is further configured to:

if it is determined that one or more processes are woken up to display the user interface, call one or more processes used in displaying the user interface, load the user interface in the normal mode, and display the user interface in the normal mode.

* * * * *